(12) United States Patent
Garrec et al.

(10) Patent No.: US 8,265,808 B2
(45) Date of Patent: Sep. 11, 2012

(54) AUTONOMOUS AND AUTOMATIC LANDING SYSTEM FOR DRONES

(75) Inventors: Patrick Garrec, Merignac (FR); Pascal Cornic, Saint Renan (FR)

(73) Assignee: Thales, Neuilly sur Siene (FR)

( * ) Notice: Subject to any disclaimer, the term of this patent is extended or adjusted under 35 U.S.C. 154(b) by 1021 days.

(21) Appl. No.: 12/095,768

(22) PCT Filed: Dec. 1, 2006

(86) PCT No.: PCT/EP2006/069198
§ 371 (c)(1),
(2), (4) Date: Sep. 25, 2008

(87) PCT Pub. No.: WO2007/063126
PCT Pub. Date: Jun. 7, 2007

(65) Prior Publication Data
US 2009/0055038 A1   Feb. 26, 2009

(30) Foreign Application Priority Data
Dec. 2, 2005 (FR) ...................................... 05 12257

(51) Int. Cl.
*G05D 1/00* (2006.01)
(52) U.S. Cl. .................. 701/16; 701/17; 342/42; 342/47
(58) Field of Classification Search .................... 701/16, 701/17; 342/42–45, 13, 47
See application file for complete search history.

(56) References Cited

U.S. PATENT DOCUMENTS

| | | | | |
|---|---|---|---|---|
| 2,572,725 A | * | 10/1951 | Hirsch | 342/33 |
| 3,626,163 A | * | 12/1971 | Dommasch | 701/17 |
| 3,952,308 A | * | 4/1976 | Lammers | 342/410 |
| 3,952,309 A | * | 4/1976 | Lammers | 342/411 |
| 5,486,830 A | * | 1/1996 | Axline et al. | 342/43 |
| 5,495,248 A | * | 2/1996 | Kawase et al. | 342/25 A |
| 5,497,158 A | * | 3/1996 | Schmid et al. | 342/90 |
| 5,926,125 A | * | 7/1999 | Wood | 342/25 F |
| 6,311,108 B1 | * | 10/2001 | Ammar et al. | 701/16 |
| 6,356,228 B1 | * | 3/2002 | Tomita | 342/33 |
| 6,430,480 B1 | * | 8/2002 | Ammar et al. | 701/16 |
| 6,591,171 B1 | * | 7/2003 | Ammar et al. | 701/16 |
| 2010/0256841 A1 | * | 10/2010 | Garrec et al. | 701/17 |
| 2011/0160941 A1 | * | 6/2011 | Garrec et al. | 701/17 |

FOREIGN PATENT DOCUMENTS

| | | |
|---|---|---|
| DE | 19620682 | 11/1996 |
| FR | 2638544 | 5/1990 |

\* cited by examiner

*Primary Examiner* — Drew Brown
(74) *Attorney, Agent, or Firm* — Lowe, Hauptman, Ham & Berner, LLP

(57) ABSTRACT

The invention relates to an automatic aircraft landing guidance system having an electromagnetic detecting and locating device, positioned on the ground and a first multifunction transmitting/receiving radiofrequency beacon, on board each guided aircraft and transmitting in particular a continuous wave. The detecting and locating device uses the continuous wave transmitted by the beacon to perform a passive locating intended to improve the accuracy of the measurement of the angular position of the aircraft. It also comprises means for generating and periodically transmitting to the aircraft, via the beacon, information enabling said aircraft to rejoin an optimum landing path from its position. The invention applies more particularly to the guidance of autonomous and automatic aircraft such as drones in the approach and landing phase.

20 Claims, 6 Drawing Sheets

AUTONOMOUS AND AUTOMATIC LANDING SYSTEM FOR DRONES

CROSS-REFERENCE TO RELATED APPLICATIONS

The present Application is based on International Application No. PCT/EP2006/069198, filed on Dec. 1, 2006, which in turn corresponds to French Application No. 0512257, filed on Dec. 2, 2005, and priority is hereby claimed under 35 USC §119 based on these applications. Each of these applications are hereby incorporated by reference in their entirety into the present application.

FIELD OF THE INVENTION

The present invention relates to the field of aircraft and in particular the field of autonomous and automatic aircraft such as drones. It more particularly relates to the guidance of such aircraft in the approach and landing phase.

BACKGROUND OF THE INVENTION

Existing landing aid systems, enabling autonomous craft to land, are currently based on various technologies.

It is possible firstly to use systems type-approved by civil aviation such as instrument landing systems (ILS) or microwave landing systems (MLS), and their military equivalents, such as PAR-type radars. Such systems are unlikely to be deployed rapidly on a landing site because they require relatively large infrastructures to be put in place on the ground. They are therefore ill-suited to the use and recovery of drones.

Another means of guiding the landing of an aircraft consists in using GPS (or differential GPS) means-based systems which offer the advantage of being inexpensive to implement. However, this solution poses the problem of the availability or the continuity of GPS service in high-accuracy mode. Furthermore, the vulnerability of the GPS systems in the presence of scramblers is well known.

Another means consists in using laser-based telemetry and guidance systems which present the advantage of not requiring any major implementation logistics, but the use of which presents the drawback of being dependent on the weather conditions and the implementation of which entails a phase of scanning for the object to be guided, because of the narrowness of the transmitted beam. Furthermore, additional equipment for absolute positioning relative to the runway is necessary.

Yet another means, similar in principle to the preceding means, consists in using a highly directional, radar tracking-type system, typically operating in the millimetric band. This type of system is, however, sophisticated and therefore costly. Also, like the laser telemetry systems, they too require a scanning phase for the designation of targets and absolute positioning relative to the runway. They are, moreover, sensitive both to climatic conditions and to the configuration of the terrain which constitutes the approach zone of the terrain on which the guided object needs to land. In particular, in the case where several aircraft are to be guided, it is essential to apply timesharing and to proceed by homing from target to target at the risk of losing a target and having to do a complete acquisition of the context. In the approach phase, after all, the guidance constraints to keep the target in the radar beam are very significant.

These last two means are the easiest to deploy on a non-equipped landing field, so they constitute the most commonly used guidance systems. However, with regard to narrow-beam transmission systems that work by pointing to the target from the ground, their implementation entails a scanning phase and dynamic locking onto the target. The risks of stalling and therefore of interrupting the guidance are significant. When the link is critical, an interruption of the tracking can result in erratic guidance with consequences that can be fatal for the aircraft. Furthermore, these solutions are generally costly and have limitations concerning in particular the servo-controlling of the transmitted beam on the position of the target in its approach movement, mechanical limitations that originate in the servo-controls. Also, regarding detection systems servo-controlled on a particular target, these systems are ill-suited to the simultaneous guidance of several drones approaching a landing zone.

SUMMARY OF THE INVENTION

One aim of the invention is to propose an alternative solution to the existing devices. To this end, the subject of the invention is an automatic aircraft landing guidance system, characterized in that it comprises at least:

an electromagnetic detecting and locating device, positioned on the ground to measure, for at least one aircraft, the distance separating it from the aircraft and the angular position of said aircraft relative to a reference direction, based on the echo reflected by said aircraft, a first multifunction radiofrequency beacon on board each guided aircraft, the beacon comprising means for exchanging information with the detecting device and for forming a point source transmitting a continuous sinusoidal wave to the detecting device, the detecting and locating device using the continuous wave transmitted by the beacon to perform a passive locating intended to improve the accuracy of the measurement of the angular position of the aircraft and comprising means for generating and periodically transmitting to the aircraft, via the beacon, information enabling said aircraft to rejoin an optimum landing path from its position.

According to a preferred embodiment, the system according to the invention also comprises a second radiofrequency beacon placed on the ground level with the point of contact of the aircraft with the ground to enable the detecting and locating device to perform differential measurements of the distance and angular position of the aircraft. The beacon on the ground comprises passive means enabling the detecting and locating device to differentiate the echo reflected by this beacon from a fixed echo.

According to a preferred embodiment variant, these passive means comprise the vanes of a moving fan.

According to another embodiment of the inventive system, the first multifunction beacon, on board the aircraft, also comprises means for performing altitude measurements, said beacon fulfilling the radio-altimeter function, the beacon periodically transmitting to the detecting and locating device information relating to the altitude of the aircraft, the altitude being measured by said beacon, the detecting and locating device using the altitude information transmitted by the beacon to improve the accuracy of the measurement of the angular position of the aircraft.

According to a particular embodiment of the invention, the operation of the detecting and locating device alternates active locating periods, of duration $\Delta T_1$, during which it measures the distance and the angular position of the aircraft from the echo reflected by said aircraft, and periods of listening and exchanging data, of duration $\Delta T_2$, during which it measures the angular position of the aircraft from the signal transmitted by the beacon, and during which it transmits positioning information to the aircraft.

According to another particular embodiment of the invention, the detecting and locating device uses the signals received during the N active locating periods forming one and the same group to perform a Doppler filtering of the signal, the filtered signal being used to perform the measurement of the distance and the angular position of the aircraft, this measurement being used jointly with the angular position measurement obtained from the signal transmitted by the beacon, in the period of listening and exchanging data that precedes said group, and with the altitude measurement transmitted by the beacon during this same period.

According to another embodiment of the invention, the system comprises a third multifunction radiofrequency beacon, identical to the first beacon and on board with the first beacon on each guided aircraft, and means making it possible to alternately use each beacon to perform the task of exchanging information with the detecting and locating device, and the task of producing a point transmission source, while the other beacon performs the altitude measurements.

In a particular implementation of this embodiment, the operation of the detecting and locating device alternates groups of N active locating periods, of duration $\Delta T_1$, during which it measures the distance and the angular position of the aircraft from the echo reflected by said aircraft, and periods of listening and exchanging data, of duration $\Delta T_2$, during which it measures the angular position of the aircraft from the signal transmitted by one of the multifunction radiofrequency beacons. During these periods of duration $\Delta T_2$ it also transmits positioning information to the aircraft via said beacon. Each group of active locating periods is then separated from the next group by a period of listening and exchanging data. The task of exchanging information with the detecting and locating device, and the task of producing a point transmission source, is performed alternately from one period of listening and exchanging data to another, by the first beacon and by the second beacon.

The proposed device advantageously presents a greater robustness to geographic and climatic conditions than the existing devices. It also presents the advantage of being simpler to design and therefore less costly. It also advantageously has the capacity to simultaneously guide several aircraft to the landing zone.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE FIGURES

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
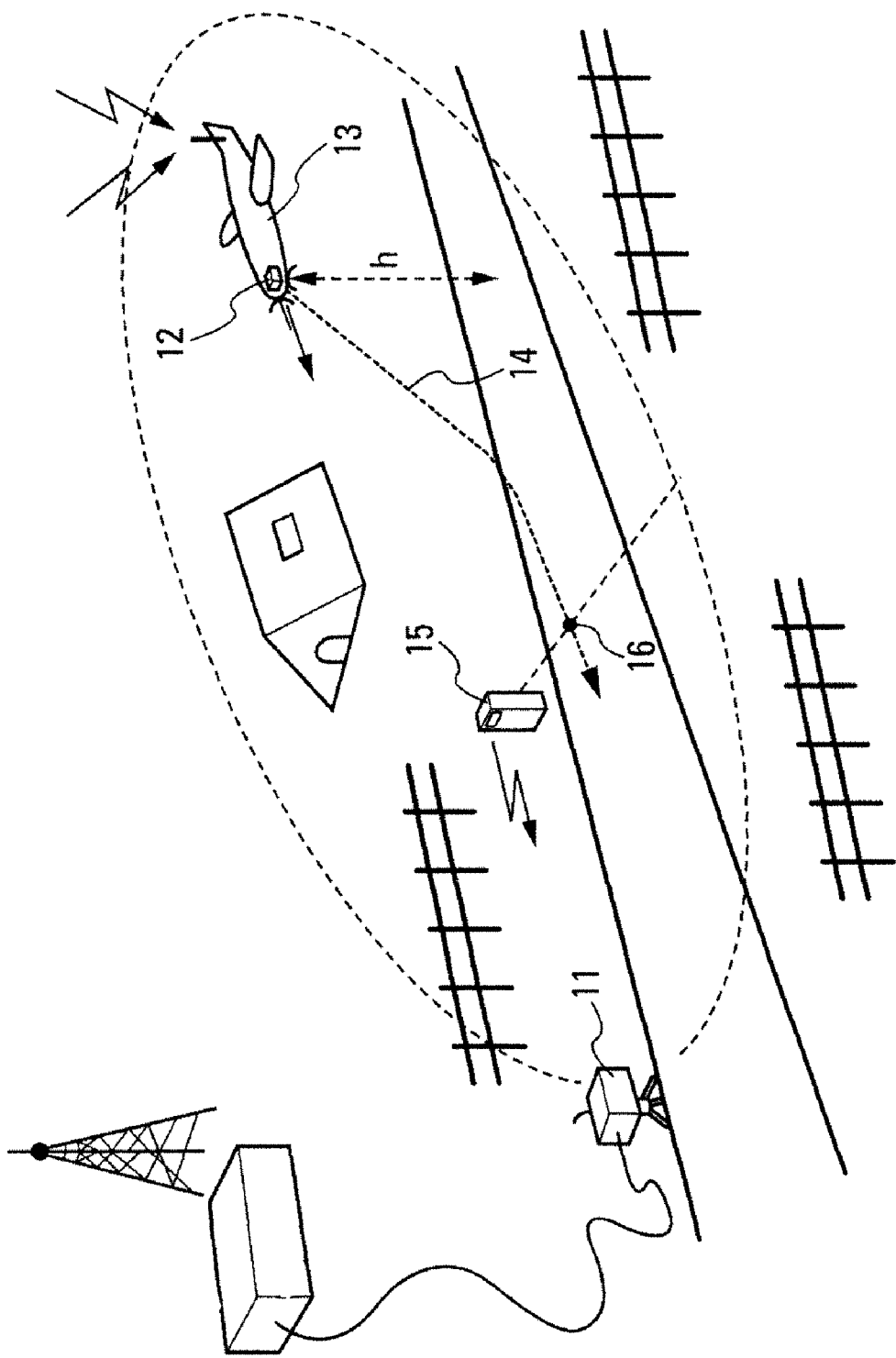
FIG. 1, an illustration of the principle of operation of a system according to the invention for automatically guiding aircraft in the approach and landing phase, FIG. 2, a diagrammatic illustration of the principle of determining the distance and the elevation of an aircraft in the approach phase, FIG. 3, a diagrammatic illustration of the principle of determining the approach direction of an aircraft, FIG. 4, a first example of typical timing diagram of the pacing of the various tasks fulfilled by the system according to the invention, FIG. 5, a second example of typical timing diagram of the pacing of the various tasks fulfilled by the system according to the invention.
Figure 2:
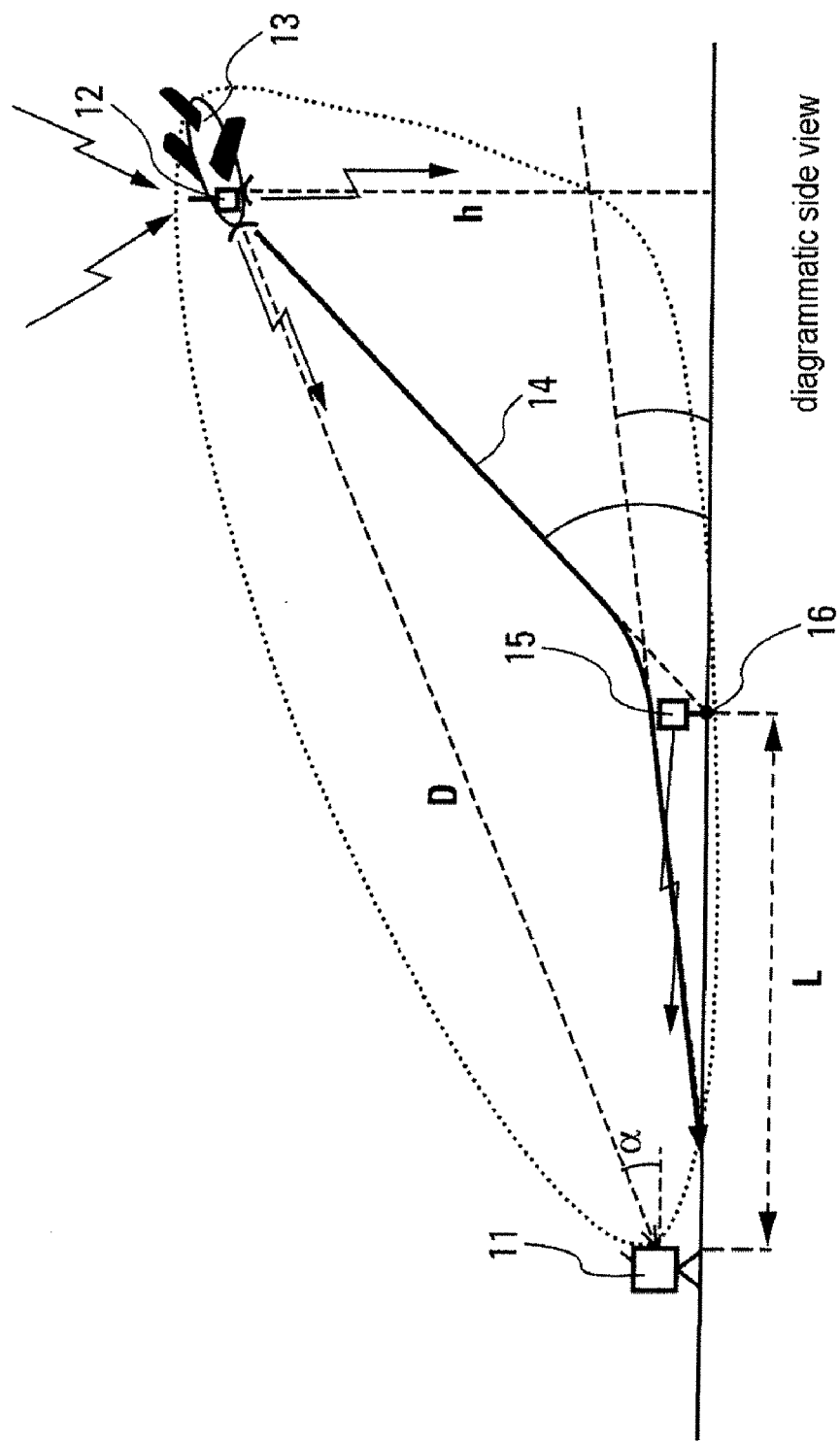
Figure 3:
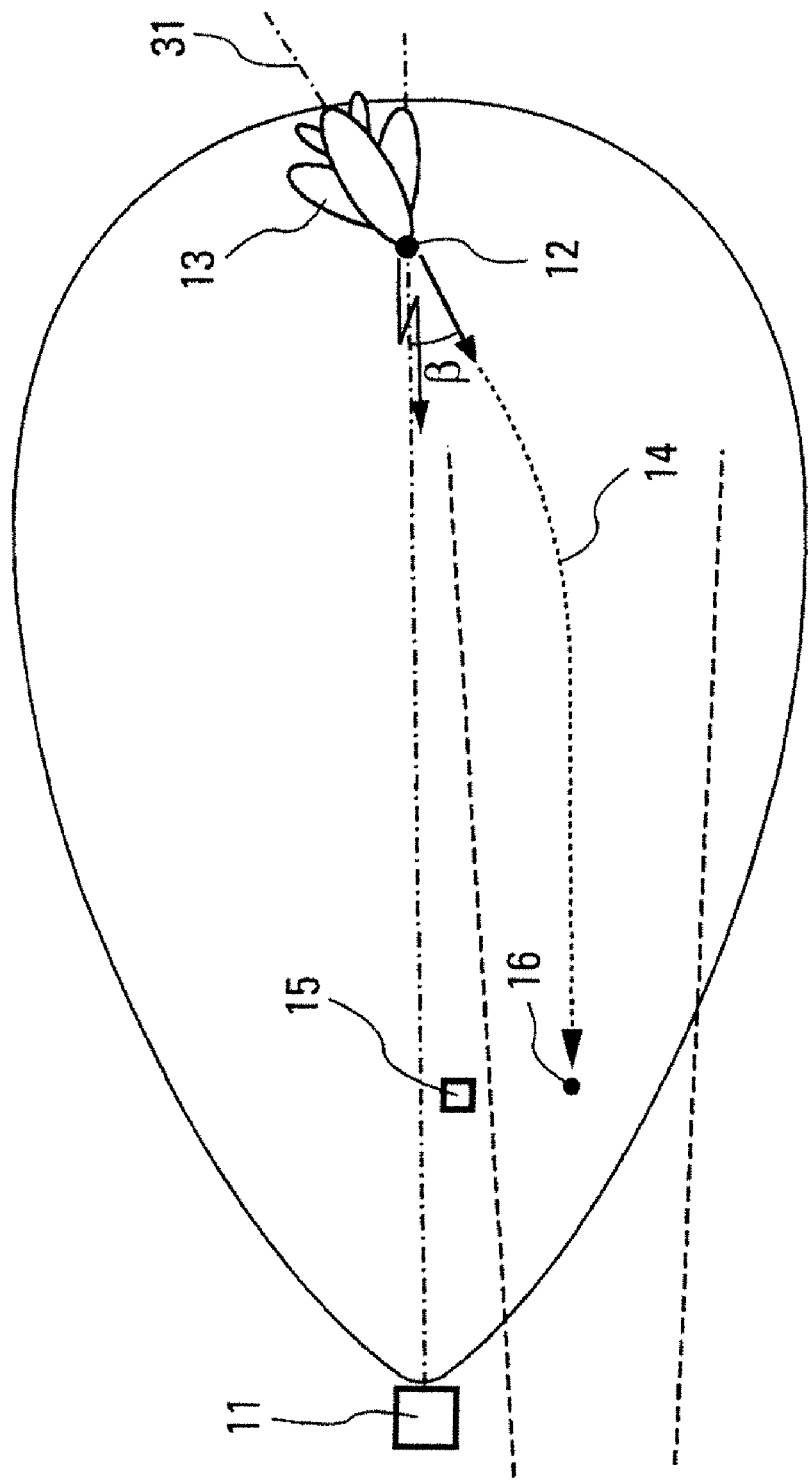

Referring firstly to FIGS. 1 to 3, these illustrate, by means of views from different angles, the principle of operation of the system according to the invention.

To automatically guide an aircraft in the landing phase, the system according to the invention mainly comprises a detecting and locating device 11, located on the ground, and a multifunction beacon 12 on board the aircraft 13.

The main function of the detecting device 11 is to periodically measure the altitude h of the aircraft 13 and the radial distance D which separates the aircraft from the point on which it is located. It also measures the direction and altitude differences that exist between the direction connecting this device to the aircraft and a reference direction, preferably parallel to the axis of the runway on which the aircraft is to land. For this, it for example applies ecartometry measurements, known from elsewhere, enabling it to determine the azimuth and the elevation relative to the guided aircraft. This device can, for example, in a particular embodiment, relatively simply comprise a landing radar made up of a conventional survey radar equipped with means of performing ecartometry measurements and pointed in a fixed way in a given direction which more or less corresponds to the optimum approach direction of the landing runway. According to the invention, this landing radar presents a radiation pattern that is wide enough to intercept one or more approaching aircraft without requiring a scanning operation.

In a more sophisticated particular embodiment, the detecting device 11 can also consist of a radar equipped with an active antenna enabling several reception beams to be formed in chosen directions. Such a device can advantageously be used in particular when the operation of the system is potentially disrupted by multiple reflections of the radar echoes on the ground and on elements of low height, buildings or vehicles for example, standing on the ground.

The position of the aircraft is determined by the radar by applying telemetry and ecartometry measurement calculations, known from elsewhere and not expanded upon here. The integration over time of the successive positions of the aircraft enables the radar to determine the path of said aircraft. This path is compared by the computer of the radar to the path enabling the aircraft to rejoin its landing point. The computer determines in particular on each measurement, the difference $\Delta_p$ existing between the real position of the aircraft at the time of the measurement and the position where the same aircraft would be situated according to the rejoining path. The rejoining path is symbolized by the broken line curve 14, the projections of which are represented in FIGS. 1 to 3.

The multifunction beacon 14, on board the aircraft, fulfils autonomous measurement functions and answering beacon functions, as well as communication functions. The radar 11 and the beacon 12 form the basic elements of the system according to the invention.

In the stabilized phase, when an aircraft is controlled by the system, the operation of the radar-beacon system more or less follows the general scheme below.

The radar 11 periodically locates the aircraft and determines the difference between this position and the position corresponding to a path enabling a satisfactory landing.

This difference is used by the computer of the radar to generate path correction information which is transmitted to the beacon 12 of the aircraft.

The multifunction beacon 12 receives the information from the radar 11 and passes it on to the computer of the aircraft 13 which performs the corresponding correction.

So as to increase the accuracy of the position measurements performed by the radar 11, the multifunction beacon 12 also handles the complementary radio-altimeter function. To this end, the onboard beacon comprises a transceiver and a computer notably intended to process the received signals. The beacon 12 also includes an antenna positioned under the aircraft and directed towards the ground. The altitude measurement is performed, in a known way, by measuring the travel time of a transmitted wave reflected by the ground. According to the invention, the measurement results are transmitted to the radar which uses them as appropriate to correct the altitude of the aircraft 13 determined using the radar echo. The altitude information supplied by the beacon 12 is more particularly used from the moment when the aircraft is located at a distance relatively close to the landing point because, in this phase, the accuracy regarding the altitude measurement becomes important.

In addition to the answering beacon and radio-altimeter function, the multifunction beacon 12 acts as a point source transmitting a signal forward of the aircraft 13 with a level substantially greater than the level of the skin echo reflected by the aircraft 13. To this end, it has an antenna, positioned at the front of the aircraft along the median line and pointing forward. According to the invention, the radiation pattern of this antenna takes the form of a narrow beam, such that the duly transmitted signal is detected by the radar as originating from a point source, and can be used by the radar 11 to accurately determine the angular position of the aircraft 13 with a better accuracy than that obtained from the reflected skin echo. The skin echo can in fact originate from various bright parts of the fuselage of the aircraft, these bright elements of the fuselage being placed at a greater or lesser distance from the median axis 31 of the aircraft. They can, for example, be the edges of the wings.

The bias induced by the scattering from the bright spots on the fuselage is in practice reflected in an error on the angular position measurement (angles $\alpha$ and $\beta$) of the aircraft 13 by the radar 11. According to the invention, this error can advantageously be corrected by comparing the angular position determined from the radar echo and the angular position determined from the signal transmitted by the beacon 12.

The transmitted signal can advantageously consist of a simple CW signal with single frequency $f_0$, transmitted continuously on a frequency located outside the band used for. The beacon 16 is then a simple device continuously transmitting a single-frequency signal.

As stated previously, the measurements of the successive positions of the aircraft over time, performed by the radar 11, enable the latter to generate correction information intended for the aircraft 13. This information is used by the latter to correct its path step by step, until it rejoins the landing trajectory 14. The correction information, or instructions, is/are transmitted to the aircraft via the communication channel available to the multifunction beacon 12. This communication channel is a bidirectional channel which also enables the aircraft 13 to communicate its altitude to the radar 11. It also enables the aircraft to communicate with an operational center connected to the radar and provide it with a variety of information, relating, for example, to the data collected during the mission being carried out. Lastly, it makes it possible to transmit to the radar 11 a variety of information relating to the identity of the aircraft 13 and the correct operation of the equipment on board.

In order to reinforce the accuracy of the distance measurement, the system according to the invention can also include a second multifunction beacon 15, fixed, positioned on the ground along the landing runway facing the point of contact 16 of the aircraft with the ground. The successive determinations of the position of the aircraft 13 relative to this point 14 can thus be performed differentially from measurements of the distance of the aircraft 13 and of the distance of the beacon 15 on the ground performed by the radar 11, and thus be free of bias.

In order to be able to differentiate the echo originating from the additional multifunction beacon 15, a fixed beacon standing on the ground, from a fixed echo that can be eliminated by processing, this beacon advantageously includes means enabling it to backscatter towards the radar an echo with a frequency that presents a Doppler shift.

In a preferred embodiment, these means consist of a moving reflector comprising, for example, a moving fan. This particular embodiment is particularly advantageous because the beacon on the ground remains a simple passive device with regard to the radar detection. However, any other solution making it possible to produce a signal synchronous with the signal transmitted by the radar and presenting a Doppler shift, can of course be considered but is more complex to implement.

For reasons of convenience, the second multifunction beacon 15, standing on the ground and designed to increase the accuracy of the distance measurement, can be of the same type as the multifunction beacon on board the aircraft and to this end include a communication function, a function which can, for example, be advantageously exploited to transmit to the radar a message relating to its operating status.

Thus, according to the invention, the guidance of the aircraft 13 is performed by means of successive position measurements performed by the radar 11 from the skin echo reflected by the aircraft. These measurements can advantageously be refined by joint analysis of measurements performed on the one-off signal transmitted by the beacon 12 located on board the aircraft, and by analysis of the altitude measurement performed by the beacon 12 and transmitted to the radar via the bidirectional communication means available to it.

Moreover, the measurements performed based on the echo reflected by the aircraft can also be stripped of any bias by adding to the system a second beacon 15 standing on the ground level with the landing point along the runway. This second beacon advantageously enables the radar to perform differential telemetry and ecartometry measurements on the aircraft.

This simple system, based on the use of a conventional radar having a wide radiation pattern, presents numerous advantages over the other guidance systems mentioned, known from the prior art. In as much as its operation does not require a permanent and accurate pointing of a guidance beam to the object to be guided, it makes it possible in particular to guide several aircraft simultaneously with a satisfactory accuracy while deploying a minimum of resources.

The beacon on board the aircraft can advantageously fulfill functions other than the creation of a point echo. It can, for example, be used to identify the aircraft 13 on which it is installed. Thus, in the case where the system according to the invention is used for the automatic guidance of several aircraft, each aircraft can be identified by a call sign.

The system according to the invention also presents the advantage of being easy to install, even on an improvised landing zone, of having a satisfactory range and of being fairly independent of the atmospheric conditions. It therefore represents a means that is overall very advantageous for handling the guidance of drones and facilitating their landing on improvised and temporary fields, having no more conventional automatic landing aid means.

Figure 4:
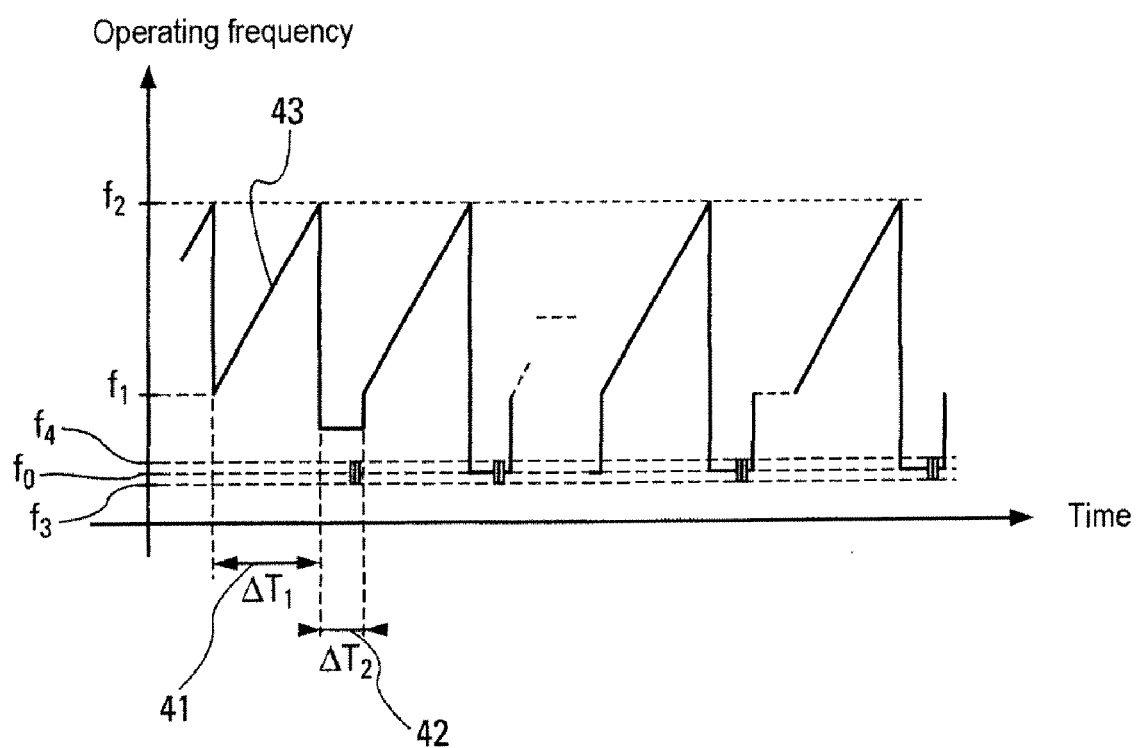

We will now turn our attention to FIG. 4 which illustrates a first example of sequencing that can be used to implement the system according to the invention.

In the example of FIG. 4, the radar 11 forming the detecting and locating device of the system is a multistatic radar, comprising a transmission channel and at least one reception channel, the transmission channel being independent of the reception channels. This configuration enables the system to send and receive signals simultaneously.

The sequencing illustrated by FIG. 4 is a simple sequencing comprising a single phase made up of the alternation of two periods of recurrences, a period 41 dedicated exclusively to the detecting and locating tasks executed by the radar 11, and a period 42 during which the radar mainly executes a listening task listening for signals transmitted by the onboard beacon 12.

During each period 41, the radar continuously transmits a wave whose frequency changes over time according to a given law, for example a linear law such as the frequency ramp 43 of FIG. 4. The transmitted signal thus behaves like a signal whose frequency varies from a value $f_1$ to a value $f_2$ during the time slot $\Delta T_1$. This well-known type of waveform enables the radar to perform, by applying the appropriate filtering to the received signal, a fine measurement of the distance of the guided aircraft. Since the radar 11 is a multistatic radar, the radar listening and the analysis of the received echoes is advantageously performed simultaneously so that, at the end of the period 41, the operation in radar mode is finished.

During each period 42, the operating mode of the radar is changed in order to perform radiofrequency listening for the signals transmitted by the beacon. As stated previously, these signals are of two types. There are the locating signal, or beacon signal, designed to increase the accuracy of location of the aircraft by the radar, and the signals carrying the information transmitted by the aircraft 13 to the radar 11 for its own use or even for the use of an operational center connected to the radar. According to a preferred, but non-exclusive, embodiment of the invention, the beacon signal is a continuous sine wave signal (CW signal), the frequency $f_0$ of which is preferably close to the band in which the radar operates during the locating period 41. That way, no change of frequency of the local oscillator of the receiver of the radar 11 is required on the transition from the period 41 to the period 42.

In this same preferred embodiment, in order to simplify the synchronization of the tasks, the beacon signal is transmitted in an interrupted way even during the periods 41. However, it is obviously possible to limit this transmission to the periods 42 provided, however, that the beacon 12 is able to know, in any way, the start instants of the periods 42 and their durations, particularly if these durations are variable over time.

This method of locating by listening is similar to that applied by certain known electromagnetic detection equipment.

The exchanges of information that can take place between the radar and the beacon during a period 42 are represented by means of signals frequency-modulated according to the appropriate law, a binary law with two frequencies $f_4$ and $f_3$ for example, as in the illustration of FIG. 4. As for the beacon signal, the frequencies $f_3$ and $f_4$ are preferably chosen to be close to the band in which the radar operates during the locating period 41.

Note that the duration $\Delta T_2$ of the period 42 is not necessarily fixed, the necessary condition being that the radar has a listening time for the signal at the frequency $f_0$ which is sufficient to handle the locating of the aircraft. The remaining time can then be used for the exchange of data between the radar 11 and the beacon 12 on board the aircraft; the data that is exchanged notably consisting of the altitude information transmitted to the radar 11 by the aircraft 13 and the information transmitted by the radar to the aircraft, relating to the heading and the altitude that the latter must reach to follow the right landing path.

The duration $\Delta T_2$ can, in particular, also vary over time so as to vary the overall duration $\Delta T = \Delta T_1 + \Delta T_2$ to enable the radar to perform nth trace echo suppression operations in a known manner.

One mode of operation, such as that illustrated by FIG. 4 for example, has the advantageous characteristic of enabling the received signal to be integrated during the successive periods 41. The succession of the frequency ramps 23, in particular, makes it possible to apply a conventional processing to the echoes reflected by the aircraft, a processing of Doppler analysis type, by FFT for example, on the signals received by the radar during N successive periods 41. This Doppler analysis makes it possible to select the skin echoes that are of interest before implementing telemetry and ecartometry measurement operations, and so avoid unnecessary computations.

Figure 5:
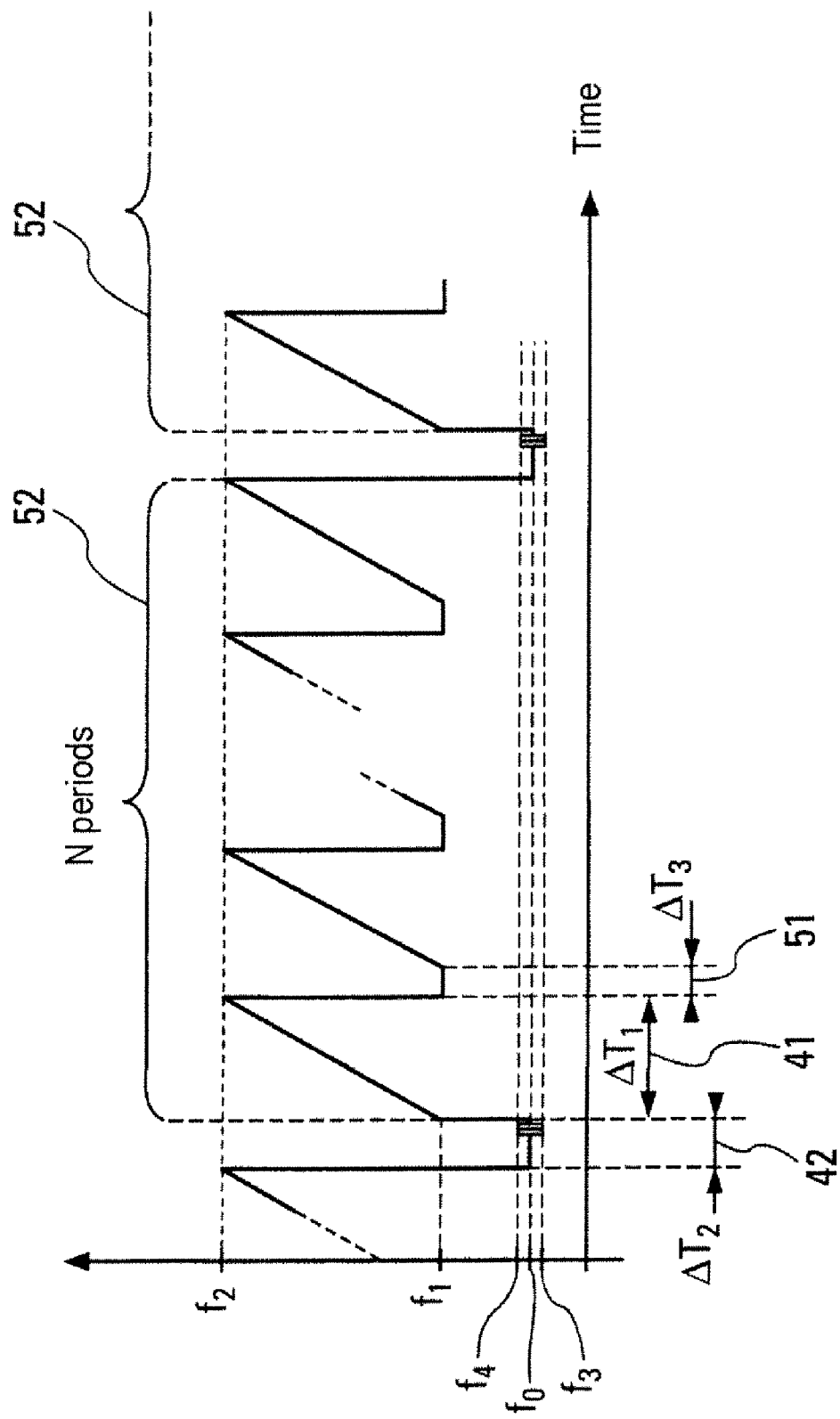

We will now focus on FIG. 5 which illustrates a second example of sequencing making it possible to implement the system according to the invention. In this example, as in the preceding example, the sequencing of the system according to the invention comprises periods 41 of duration $\Delta T_1$ during which the radar performs tasks for detecting and locating reflected echoes. Similarly, as previously, the radar transmits a signal during this period whose frequency follows a continuous trend law between a frequency $f_1$ and a frequency $f_2$, a ramp for example. Similarly again, the sequencing illustrated by FIG. 5 also comprises periods 42 of duration $\Delta T_2$ during which the radar 11 carries out a radiofrequency listening for signals originating from the beacon 12 on board the aircraft. However, unlike the preceding example, the periods 41 and 42 are not alternate, but are arranged so that each period 42 is separated from the next by N periods 41, each period 41 being separated from the next by a time slot 51, the duration $\Delta T_3$ of which takes account of the propagation times of the processed signals and the processing delays which are notably dependent on the range provided by the radar 11. According to the chosen embodiment, the duration $\Delta T_3$ can be fixed or can even be variable so as to allow the radar to continuously perform operations to suppress nth trace echoes.

The sequencing of FIG. 5 thus appears like a succession of groups 52 of N periods 41 of duration $\Delta T_1$, each group being separated from the next by a listening period 42.

This type of sequencing is advantageously well-suited to the systems according to the invention, for which the radar 11 performs a Doppler analysis of the signal relating to the signal acquisitions performed during a number N of occurrences. In practice, the detecting and locating are then performed only on the filtered signal, the location obtained after N periods 41 possibly then being associated with the locating performed from the beacon signal during the period 42 preceding the group of N periods 41 considered. This sequencing thus presents the advantage of limiting the time devoted to the listening periods 42 to just those listening periods that can be associated with a location obtained after N radar detecting and locating periods 41.

Figure 6:
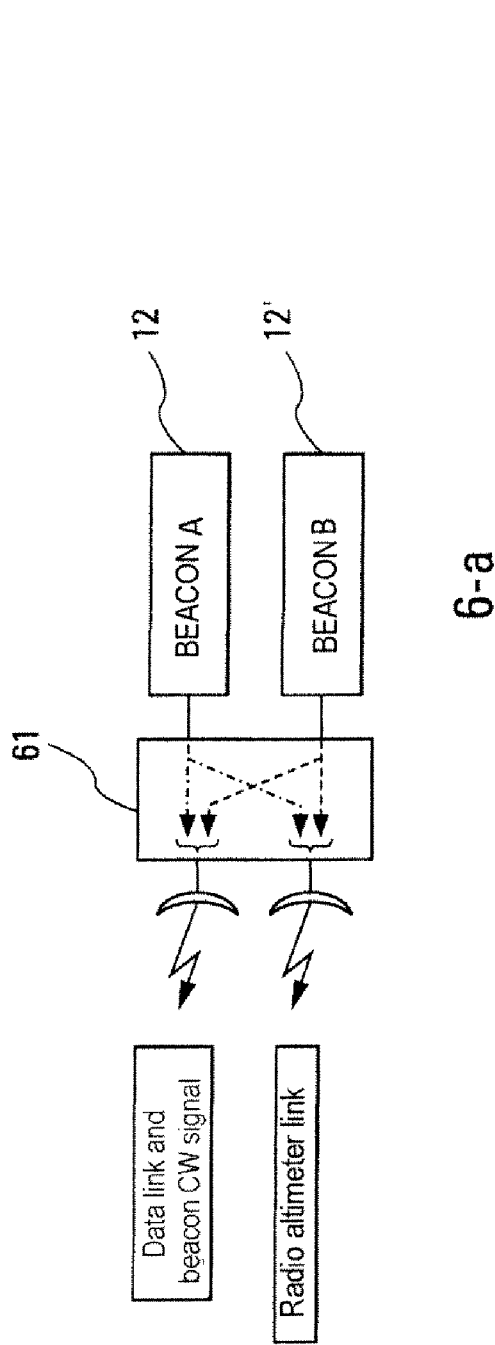
FIG. 6 includes a system block diagram (FIG. 6-a) and a timing diagram (FIG. 6-b) in accordance with one or more embodiments.
Figure 6:
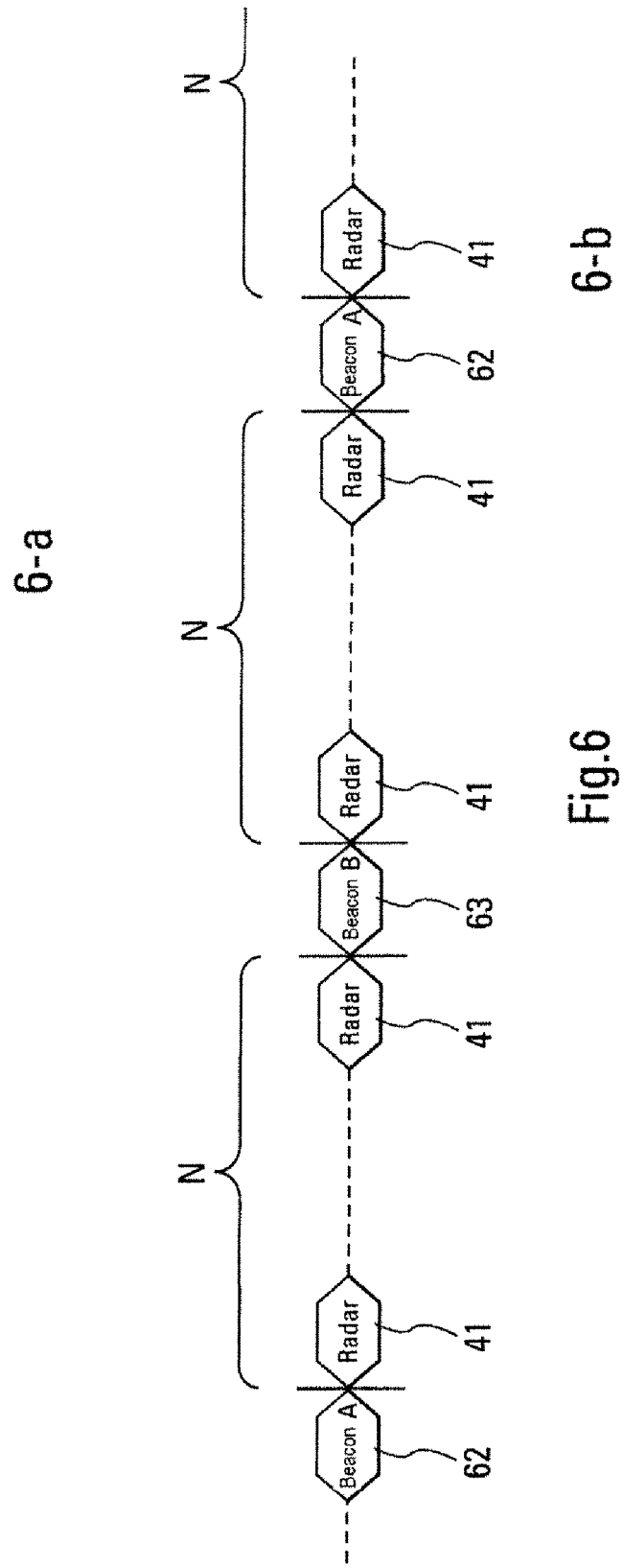

We will now refer to FIG. 6 which illustrates an advantageous embodiment variant of the system according to the invention (FIG. 6-*a*) and an example of sequencing suited to this variant (FIG. 6-*b*).

As FIG. 6-*a* illustrates, in this particular embodiment variant, the system according to the invention comprises a third multifunction beacon 12', on board the aircraft with the first beacon 12. The two beacons 12 and 12' are arranged so that each of them alternately fulfils the beacon signal communication and transmission functions followed by the altimetric measurement function, the other beacon at the same time fulfilling the altimetric measurement function followed by the beacon signal communication and transmission functions. Thus, each of the beacons is used alternately to transmit the beacon signal and exchange information with the radar 11, then to perform an altitude measurement. To handle the switching of the beacons to one or other of the antennas, the system also includes in this variant automatic switching means 61.

The benefit of this embodiment variant of the system according to the invention can be highlighted by means of the sequencing timing diagram of FIG. 6-*b* offered by way of nonlimiting example. According to this schematic timing diagram, the proposed sequencing consists of a succession of groups of N periods 41 during which the radar 11 performs locating tasks on the skin echo of the aircraft, these groups being separated alternately from each other either by a period 62 or by a period 63. During a period 62, one of the two onboard beacons, the beacon 12 for example, performs the operations for exchanging data with the radar and handles the transmission of the beacon signal to the radar, whereas the second beacon, the beacon 12', performs other tasks, for example altimetry measurements. Conversely, during a period 63, the other beacon, the beacon 12', in turn performs the operations for exchanging data with the radar and handles the transmission of the beacon signal to the radar, whereas the first beacon performs other tasks.

This particular embodiment, associated with an appropriate sequencing of the type of that illustrated by FIG. 6-*a*, presents, because of the redundancy of the equipment on board the aircraft, several significant advantages. In particular, it makes it possible to provide, should one of the two beacons 12 or 12' fail, a degraded mode of operation which does, however, enable the radar and the beacon that is still operating to provide a satisfactory guidance of the aircraft to its landing point. In this degraded mode, the whole of the communications between the radar and the remaining beacon is renewed, in the worst case where one of the two beacons is no longer providing any function, with a time slot twice the normal slot, every period 61 for example if the beacon 12' has failed, a time slot that can, however, be determined in the sequencing so that a satisfactory guidance of the aircraft remains possible. In this embodiment variant, the system according to the invention therefore advantageously provides an increase in reliability for the whole of the operation.

In order to assist the explanation, the automatic landing system according to the invention has been described in the above text for a configuration involving a single aircraft. This configuration is of course not limiting and the system according to the invention is naturally applicable to more complex configurations in which several aircraft have to be guided and made to land. In such a configuration, the system then comprises at least one detecting and locating device, for example a radar 11, located on the ground, associated or not with a beacon 14 on the ground, and a plurality of multifunction beacons on board the aircraft for which the system handles the landing. Each of the aircraft thus carries, depending on the embodiment concerned, a beacon 12 or a group of two beacons 12 and 12'.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. An automatic aircraft landing guidance system, comprising:
    an electromagnetic detecting and locating device, positioned on the ground to measure, for at least one aircraft, the distance separating it from the aircraft and the angular position of said aircraft relative to a reference direction, based on the echo reflected by said aircraft,
    a first multifunction radiofrequency beacon on board each guided aircraft, the beacon comprising means for exchanging information with the detecting device and forming a point source transmitting a continuous sinusoidal wave to the detecting device,
    the detecting and locating device using the continuous wave transmitted by the beacon to perform a passive locating intended to improve the accuracy of the measurement of the angular position of the aircraft and comprising means for generating and periodically transmitting to the aircraft, via the beacon, information enabling said aircraft to rejoin an optimum landing path from its position.

2. The system as claimed in claim 1, further comprising a second radiofrequency beacon placed on the ground level with the point of contact of the aircraft with the ground to enable the detecting and locating device to perform differential measurements of the distance and angular position of the aircraft.

3. The system as claimed in claim 2, wherein the second beacon comprises passive means enabling the detecting and locating device to differentiate the echo reflected by this beacon from a fixed echo.

4. The system as claimed in claim 3, wherein said passive means comprise the vanes of a moving fan.

5. The system as claimed in claim 1, wherein the onboard multifunction beacon comprises means for performing altitude measurements, said beacon fulfilling the radio-altimeter function.

6. The system as claimed in claim 3, wherein the beacon periodically transmits to the detecting and locating device information relating to the altitude of the aircraft, the altitude being measured by said beacon.

7. The system as claimed in claim 4, wherein the detecting and locating device uses the altitude information transmitted by the beacon to improve the accuracy of the measurement of the angular position of the aircraft.

8. The system as claimed in claim 1, wherein the operation of the detecting and locating device alternates active locating periods, of duration $\Delta T_1$, during which it measures the distance and the angular position of the aircraft from the echo reflected by said aircraft, and periods of listening and exchanging data, of duration $\Delta T_2$, during which it measures the angular position of the aircraft from the signal transmitted by the beacon, and during which it transmits the positioning information to the aircraft.

9. The system as claimed in claim 1, wherein the operation of the detecting and locating device alternates groups of N active locating periods, of duration $\Delta T_1$, during which it measures the distance and the angular position of the aircraft from the echo reflected by said aircraft and periods of listening and exchanging data, of duration $\Delta T_2$, during which it measures the angular position of the aircraft from the signal transmitted by the beacon, and during which it transmits positioning information to the aircraft, each group of active locating periods being separated from the next group by a period of listening and exchanging data.

10. The system as claimed in claim 7, wherein the detecting and locating device uses the signals received during the N active locating periods forming one and the same group to perform a Doppler filtering of the signal, the filtered signal being used to perform the measurement of the distance and the angular position of the aircraft, this measurement being used jointly with the angular position measurement obtained from the signal transmitted by the beacon, in the period of listening and exchanging data that precedes said group, and with the altitude measurement transmitted by the beacon during this same period.

11. The system as claimed in claim 1, comprising a third multifunction radiofrequency beacon, identical to the first beacon and on board with the first beacon on each guided aircraft, and means making it possible to alternately use each beacon to perform the task of exchanging information with the detecting and locating device, and the task of producing a point transmission source, while the other beacon performs the altitude measurements.

12. The system as claimed in claim 9, wherein the operation of the detecting and locating device alternates groups of N active locating periods, of duration $\Delta T1$, during which it measures the distance and the angular position of the aircraft from the echo reflected by said aircraft, and periods of listening and exchanging data, of duration $\Delta T2$, during which it measures the angular position of the aircraft from the signal transmitted by one of the multifunction radiofrequency beacons, and during which it transmits positioning information to the aircraft via said beacon; each group of active locating periods being separated from the next group by a period of listening and exchanging data, the task of exchanging information with the detecting and locating device, and the task of producing a point transmission source being performed alternately from one period of listening and exchanging data to another, by the first and by the second beacon.

13. The system as claimed in claim 1, wherein the detecting and locating device is a radar comprising means for performing distance and angular locating measurements.

14. The system as claimed in claim 11, wherein the radar used is a beam-forming radar.

15. The system as claimed in claim 2, wherein the onboard multifunction beacon comprises means for performing altitude measurements, said beacon fulfilling the radio-altimeter function.

16. The system as claimed in claim 2, wherein the operation of the detecting and locating device alternates active locating periods, of duration $\Delta T_1$, during which it measures the distance and the angular position of the aircraft from the echo reflected by said aircraft, and periods of listening and exchanging data, of duration $\Delta T_2$, during which it measures the angular position of the aircraft from the signal transmitted by the beacon, and during which it transmits the positioning information to the aircraft.

17. The system as claimed in claim 3, wherein the operation of the detecting and locating device alternates active locating periods, of duration $\Delta T_1$, during which it measures the distance and the angular position of the aircraft from the echo reflected by said aircraft, and periods of listening and exchanging data, of duration $\Delta T_2$, during which it measures the angular position of the aircraft from the signal transmitted by the beacon, and during which it transmits the positioning information to the aircraft.

18. The system as claimed in claim 4, wherein the operation of the detecting and locating device alternates groups of N active locating periods, of duration $\Delta T_1$, during which it measures the distance and the angular position of the aircraft from the echo reflected by said aircraft and periods of listening and exchanging data, of duration $\Delta T_2$, during which it measures the angular position of the aircraft from the signal transmitted by the beacon, and during which it transmits positioning information to the aircraft, each group of active locating periods being separated from the next group by a period of listening and exchanging data.

19. The system as claimed in claim 5, wherein the operation of the detecting and locating device alternates groups of N active locating periods, of duration $\Delta T_1$, during which it measures the distance and the angular position of the aircraft from the echo reflected by said aircraft and periods of listening and exchanging data, of duration $\Delta T_2$, during which it measures the angular position of the aircraft from the signal transmitted by the beacon, and during which it transmits positioning information to the aircraft, each group of active locating periods being separated from the next group by a period of listening and exchanging data.

20. The system as claimed in claim 6, wherein the operation of the detecting and locating device alternates groups of N active locating periods, of duration $\Delta T_1$, during which it measures the distance and the angular position of the aircraft from the echo reflected by said aircraft and periods of listening and exchanging data, of duration $\Delta T_2$, during which it measures the angular position of the aircraft from the signal transmitted by the beacon, and during which it transmits positioning information to the aircraft, each group of active locating periods being separated from the next group by a period of listening and exchanging data.

* * * * *